US012055636B2

(12) United States Patent
Howard et al.

(10) Patent No.: US 12,055,636 B2
(45) Date of Patent: *Aug. 6, 2024

(54) TECHNIQUES FOR ADJUSTING A BEAM PATTERN IN A LIDAR SYSTEM

(71) Applicant: AEVA, INC., Mountain View, CA (US)

(72) Inventors: Cameron Howard, Bend, OR (US); Sawyer Isaac Cohen, Menlo Park, CA (US); Keith Gagne, Santa Clara, CA (US); Bradley Scot Levin, San Jose, CA (US); Pierre Hicks, San Francisco, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,271

(22) Filed: Apr. 27, 2023

(65) Prior Publication Data
US 2024/0142626 A1 May 2, 2024

Related U.S. Application Data

(63) Continuation of application No. 17/977,937, filed on Oct. 31, 2022, now Pat. No. 11,675,085.

(51) Int. Cl.
*G01S 17/00* (2020.01)
*G01S 7/481* (2006.01)
*G01S 17/32* (2020.01)
*G01S 17/89* (2020.01)

(52) U.S. Cl.
CPC ............ *G01S 17/89* (2013.01); *G01S 7/4817* (2013.01); *G01S 17/32* (2013.01)

(58) Field of Classification Search
USPC ........................................................ 356/5.01
See application file for complete search history.

(56) References Cited

U.S. PATENT DOCUMENTS

| 10,401,480 | B1 | 9/2019 | Gaalema et al. |
| 10,401,481 | B2 | 9/2019 | Campbell et al. |
| 10,802,120 | B1 | 10/2020 | LaChapelle et al. |
| 10,908,267 | B1 | 2/2021 | Gagne et al. |
| 10,948,598 | B1 | 3/2021 | Prabhakar et al. |
| 10,960,900 | B1 | 3/2021 | Crouch et al. |
| 10,969,488 | B2 | 4/2021 | Campbell |
| 10,976,415 | B1 | 4/2021 | Gagne et al. |

(Continued)

*Primary Examiner* — James R Hulka
(74) *Attorney, Agent, or Firm* — Womble Bond Dickinson (US) LLP (57) ABSTRACT

A system and method receive a first beam pattern from an optical source that includes optical beams transmitted towards a target. The system and method measure a first vertical angle between at least two of the optical beams along a first axis relative to the FMCW LIDAR system. The system and method calculate a second beam pattern based on the first vertical angle and a pivot point. The second beam pattern produces a second vertical angle between the two optical beams. The system and method adjust one or more components from a first position that forms the first beam pattern to a second position that forms the second beam pattern for transmission towards the target. The system and method receive one or more return optical beams from the target, based on the second beam pattern, to produce a plurality of points to form the point cloud.

20 Claims, 8 Drawing Sheets

(56) References Cited

U.S. PATENT DOCUMENTS

| | | |
|---|---|---|
| 10,983,213 B2 | 4/2021 | Eichenholz et al. |
| 11,022,688 B2 | 6/2021 | Eichenholz et al. |
| 11,029,395 B1 | 6/2021 | Barber et al. |
| 11,047,983 B1 | 6/2021 | Prabhakar et al. |
| 11,099,260 B1 | 8/2021 | Gagne et al. |
| 11,156,715 B1 | 10/2021 | Avci et al. |
| 11,215,701 B2 | 1/2022 | Behzadi et al. |
| 11,320,522 B1 | 5/2022 | Avci et al. |
| 11,333,949 B1 | 5/2022 | Levin et al. |
| 11,360,198 B1 | 6/2022 | Gagne et al. |
| 11,366,200 B2 | 6/2022 | Krause Perin et al. |
| 11,378,396 B2 | 7/2022 | Sebastian et al. |
| 11,385,332 B2 | 7/2022 | Behzadi et al. |
| 11,467,267 B1 | 10/2022 | John et al. |
| 11,486,983 B1 | 11/2022 | Behzadi et al. |
| 11,486,986 B2 | 11/2022 | Rezk et al. |
| 11,525,901 B2 | 12/2022 | Oza et al. |
| 11,525,916 B2 | 12/2022 | Avci et al. |
| 11,536,813 B1 | 12/2022 | Gagne et al. |
| 11,675,085 B1 * | 6/2023 | Howard ................. G01S 7/4972 356/5.1 |
| 2018/0284237 A1 | 10/2018 | Campbell et al. |
| 2018/0284276 A1 | 10/2018 | Campbell |
| 2018/0284280 A1 | 10/2018 | Eichenholz et al. |
| 2018/0284286 A1 | 10/2018 | Eichenholz et al. |
| 2020/0116832 A1 | 4/2020 | Singer |
| 2020/0124711 A1 | 4/2020 | Rezk et al. |
| 2020/0271785 A1 | 8/2020 | Sebastian et al. |
| 2020/0300980 A1 | 9/2020 | Behzadi et al. |
| 2020/0319314 A1 | 10/2020 | Behzadi et al. |
| 2020/0400798 A1 | 12/2020 | Rezk et al. |
| 2021/0096228 A1 | 4/2021 | Behzadi et al. |
| 2021/0181309 A1 | 6/2021 | Oza et al. |
| 2021/0181320 A1 | 6/2021 | Oza et al. |
| 2022/0003868 A1 | 1/2022 | Avci et al. |
| 2022/0091242 A1 | 3/2022 | Gagne et al. |
| 2022/0120871 A1 | 4/2022 | Krause Perin et al. |
| 2022/0121080 A1 | 4/2022 | Yao |
| 2022/0146633 A1 | 5/2022 | Gagne et al. |
| 2022/0163669 A1 | 5/2022 | Prabhakar et al. |
| 2022/0236393 A1 | 7/2022 | Behzadi et al. |
| 2022/0291354 A1 | 9/2022 | Behzadi et al. |
| 2022/0334232 A1 | 10/2022 | Behzadi et al. |

* cited by examiner

TECHNIQUES FOR ADJUSTING A BEAM PATTERN IN A LIDAR SYSTEM

CROSS REFERENCE TO RELATED APPLICATIONS

This application is a continuation of U.S. patent application Ser. No. 17/977,937, filed Oct. 31, 2022, the disclosure of which is incorporated herein by reference in its entirety.

TECHNICAL FIELD

The present disclosure relates generally to optical beam patterns, and more particularly to systems and methods for adjusting a beam pattern in a frequency-modulated continuous wave (FMCW) light detection and ranging (LIDAR) system.

BACKGROUND

Frequency-modulated continuous wave (FMCW) LIDAR systems use tunable lasers for frequency-chirped illumination of targets and coherent receivers for detection of backscattered or reflected light from the targets, which are combined with a local copy of the transmitted signal (LO signal). Conventional LIDAR systems require high frame rates and an increased number of scanning points typically achieved by using multiple numbers of optical beams. The optical beams may be placed in a one-dimensional or two-dimensional array separated by a pitch. An optical source may collimate the optical beams using a single output lens, which provides a vertical angle between the collimated optical beams to form a beam pattern. A challenge found with using such configurations is the inflexibility to individually adjust each optical beam's position relative to the other optical beams to form a beam pattern. In addition, based on assembly processes, material properties, part tolerances, environmental conditions, and etcetera, the beam pattern produced by the optical source may not provide acceptable beam spacings between the optical beams along an axis relative to the LIDAR system which, in turn, can cause object detection issues.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One aspect disclosed herein is directed to a method of adjusting a beam pattern to form a point cloud in a frequency-modulated continuous wave (FMCW) light detection and ranging (LIDAR) system. As discussed herein, an FMCW LIDAR system may also be referred to as a LIDAR system.

In some embodiments, the method includes receiving a beam pattern from an optical source. In some embodiments, the beam pattern includes optical beams transmitted towards a target to cause different spaces to form between each optical beam of the optical beams. In some embodiments, the method also includes measuring a vertical angle between the optical beams along an axis relative to the FMCW LIDAR system. In some embodiments, the method also includes calculating, using a processor, an adjusted beam pattern based on the vertical angle and a pivot point within the FMCW LIDAR system that causes the optical beams to be transmitted towards the target with substantially uniform spacing between each optical beam of the optical beams. In some embodiments, the method also includes adjusting, at the pivot point, components from a position that forms the beam pattern to an adjusted position that forms the adjusted beam pattern in the FMCW LIDAR system, which adjusts the different spaces to the substantially uniform spacing for transmission towards the target. In some embodiments, the method also includes receiving return optical beams from the target, based on the adjusted beam pattern, to produce points to form the point cloud. Other embodiments of this aspect include corresponding computer systems, apparatus, and computer programs recorded on one or more computer storage devices, each configured to perform the actions of the methods.

In some embodiments, the optical beams form a vertical angle corresponding to the beam pattern and form an adjusted vertical angle corresponding to the adjusted beam pattern. The vertical angle and the adjusted vertical angle are both vertical components of angular separation in a scan frame between the two optical beams.

In some embodiments, a portion of the adjusting of the components rotates the optical source about a different axis relative to the axis. In some embodiments, the adjusting may include rotating a scanner about a different axis not parallel to the axis. In some embodiments, the method may include receiving the beam pattern from the scanner at a different scanner, and the adjusting further may include rotating the different scanner until the adjusted beam pattern is formed. In some embodiments, the method may include analyzing the point cloud and dynamically re-adjusting, responsive to analyzing the point cloud, the components to re-create the adjusted beam pattern. In some embodiments, the method may include detecting an object in the point cloud, determining another beam pattern based on the object, and adjusting, at the pivot point, the components to a different position that forms the other beam pattern in the FMCW LIDAR system. Implementations of the described techniques may include hardware, a method or process, or computer software on a computer-accessible medium.

In another aspect, the present disclosure is directed to FMCW LIDAR system that includes an optical source to generate a beam pattern may include optical beams transmitted towards a target to cause different spaces to form between each optical beam of the optical beams. In some embodiments, the FMCW LIDAR systems includes a memory to store instructions and a processor coupled to the memory that, when executing the set of instructions, is configured to measure a vertical angle between the optical beams along an axis relative to the FMCW LIDAR system. In some embodiments, the processor is configured to calculate an adjusted beam pattern based on the vertical angle and a pivot point within the FMCW LIDAR system that causes the optical beams to be transmitted towards the target with substantially uniform spacing between each optical beam of the optical beams. In some embodiments, the processor is configured to adjust, at the pivot point, the components from a position that forms the beam pattern to an adjusted position that forms the adjusted beam pattern in the FMCW LIDAR system to adjust the different spaces to the substantially uniform spacing for transmission towards the target. In some embodiments, the processor is configured to receive return optical beams from the target, based on the adjusted beam pattern, to produce points to form a point cloud.

In another aspect, the system includes an FMCW LIDAR system with an optical assembly that includes an optical source and scanners. In some embodiments, the optical assembly to generate a beam pattern that includes optical beams transmitted towards a target to cause different spaces to form between each optical beam of the optical beams. In some embodiments, the optical assembly includes a beam pattern adjustment assembly. In some embodiments, the beam pattern adjustment assembly to adjust, at a pivot point, components from a position that forms the beam pattern to an adjusted position that forms an adjusted beam pattern. In some embodiments, the FMCW LIDAR system also includes a LIDAR control system coupled to the optical assembly. In some embodiments, the LIDAR control system includes one or more processors to measure a vertical angle between the optical beams along an axis relative to the FMCW LIDAR system. In some embodiments, the LIDAR control system to calculate the adjusted beam pattern based on the vertical angle and the pivot point within the FMCW LIDAR system that causes the optical beams to be transmitted towards the target with substantially uniform spacing between each optical beam of the optical beams. In some embodiments, the LIDAR control system to instruct the beam pattern adjustment assembly to perform the adjusting. In some embodiments, the LIDAR control system to receive return optical beams from the target, based on the adjusted beam pattern, to produce points to form a point cloud. Other embodiments of this aspect include corresponding computer systems, apparatus, and computer programs recorded on one or more computer storage devices, each configured to perform the actions of the methods.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

As will be described in greater detail herein, embodiments of the present disclosure include an optical source that includes the functionality to produce a beam pattern with vertical angles between collimated optical beams. Embodiments of the present disclosure include approaches to both statically and dynamically perform beam pattern adjustments in an FMCW LIDAR system to meet stringent beam spacing specifications.

Figure 1:
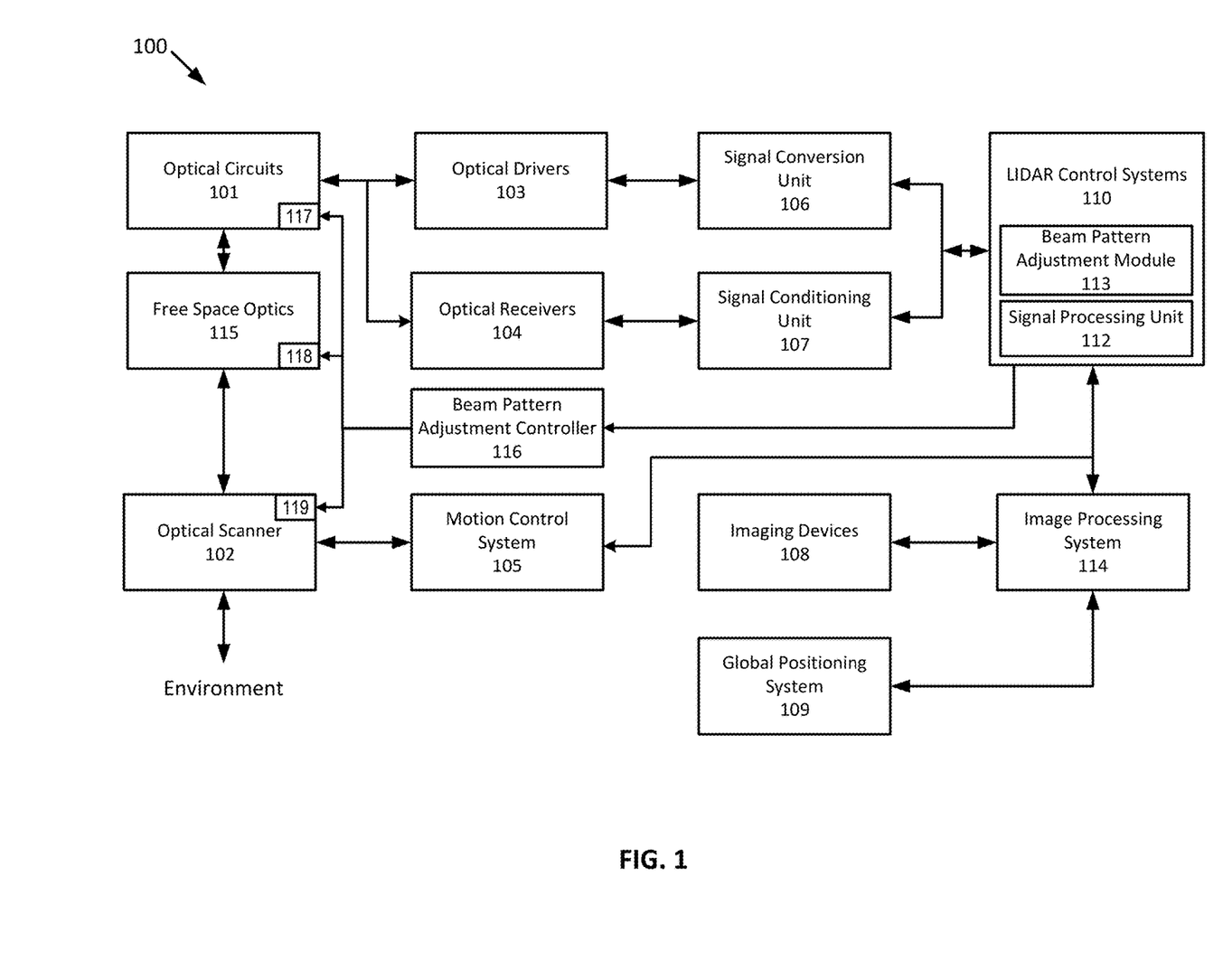
FIG. 1 is a block diagram illustrating an example of a LIDAR system, according to some embodiments.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free-space relative to the vehicle. In some embodiments, the vehicle may include a steering system and a braking system, each of which may work in combination with one or more LIDAR systems 100 according to any information (e.g., one or more rigid transformations, distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processor or processing device for the LIDAR system 100. In some examples, the processor or processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processor or processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processor or processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

In some embodiments, LIDAR control systems 110 include beam pattern adjustment module 113 (e.g., software code). In some embodiments, signal processing unit 112 executes beam pattern adjustment module 113 and interfaces with beam pattern adjustment controller 116 to adjust various optical components. In some embodiments, adjustment components 117, 118, and 119 are, for example, actuators that introduce rotational elements into the beam pattern by rotating optical sources and/or scanners in optical circuits 101, free space optics 115, and/or optical scanner 102, respectively, to achieve a desired beam pattern. In some embodiments, signal processing unit 112 communicates directly with adjustment components 117, 118, and 119 to adjust optical circuits 101, free space optics 115, and/or optical scanner 102.

In some embodiments, signal processing unit 112, when executing beam pattern adjustment module 113, can use apriori data, stored in resident computer memory, that includes desired beam spacing specifications to form the control signals that instruct scanners and/or optical sources to rotate about a predefined pivot point within the LIDAR system 100. Predefined pivot points may include, but are not limited to, points that a component can rotate about in order to rotate the beams with respect to a scanning direction of LIDAR system 100.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processing unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
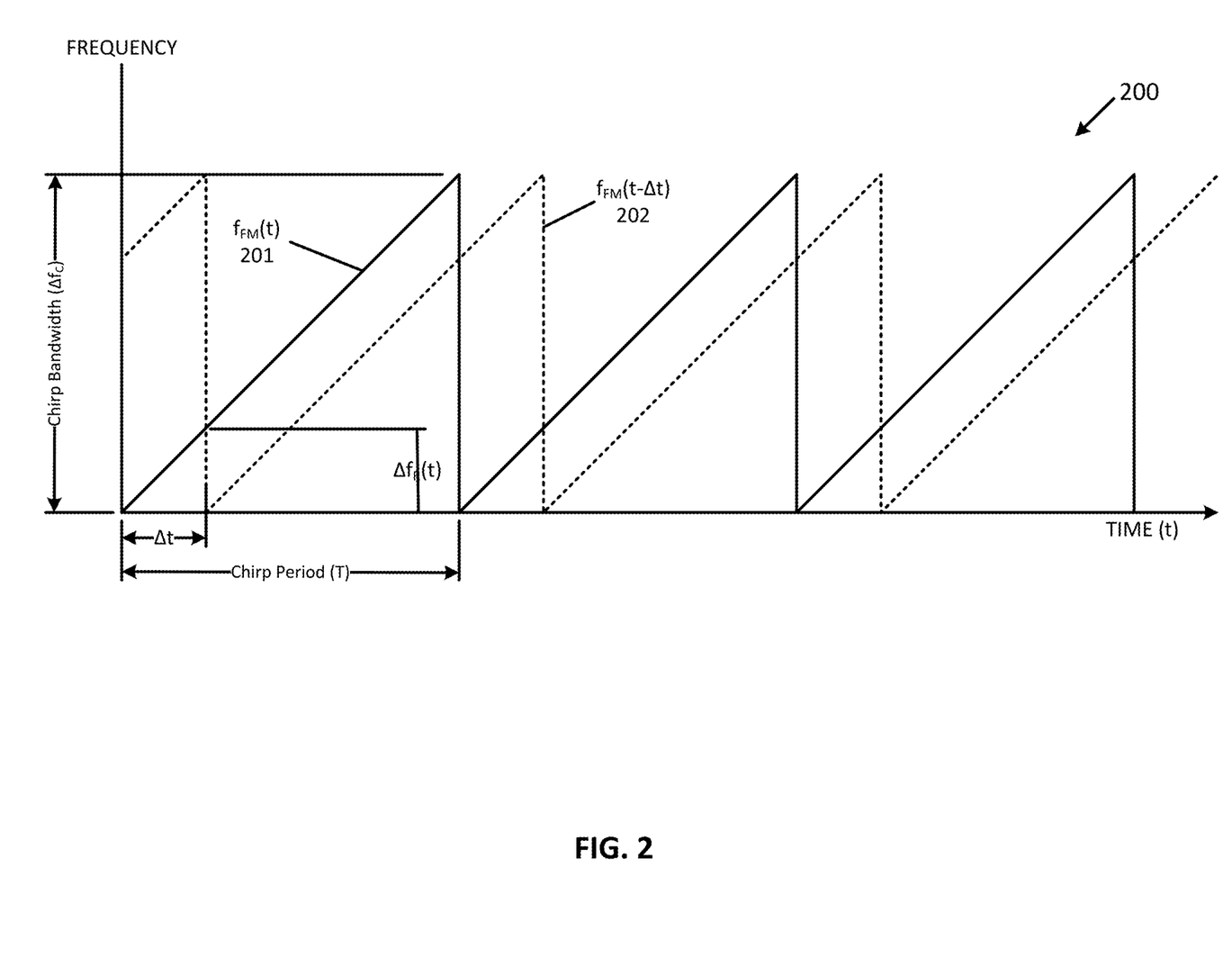
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as fFM(t), is a sawtooth waveform (sawtooth "chirp") with a chirp bandwidth $\Delta fC$ and a chirp period TC. The slope of the sawtooth is given as k=($\Delta fC/TC$). FIG. 2 also depicts target return signal 202 according to some embodiments. Target return signal 202, labeled as fFM(t−$\Delta t$), is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as R=c($\Delta t/2$). When the return signal 202 is optically mixed with the scanning signal, a range-dependent difference frequency ("beat frequency") $\Delta fR(t)$ is generated. The beat frequency $\Delta fR(t)$ is linearly related to the time delay $\Delta t$ by the slope of the sawtooth k. That is, $\Delta fR(t)=k\Delta t$. Since the target range R is proportional to $\Delta t$, the target range R can be calculated as R=(c/2)($\Delta fR(t)/k$). That is, the range R is linearly related to the beat frequency $\Delta fR(t)$. The beat frequency $\Delta fR(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta fRmax$) is 500 megahertz. This limit in turn determines the maximum range of the system as Rmax=(c/2)($\Delta fRmax/k$) which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
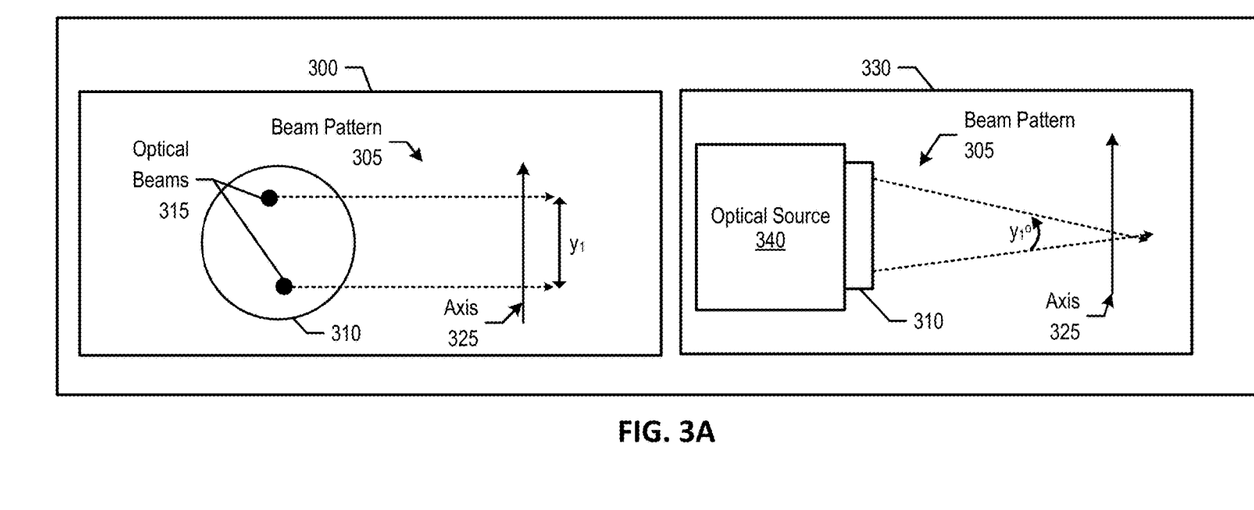
FIGS. 3A-3B are block diagrams depicting examples of adjusting a beam pattern originating from an optical source that transmits two optical beams.
Figure 3B:
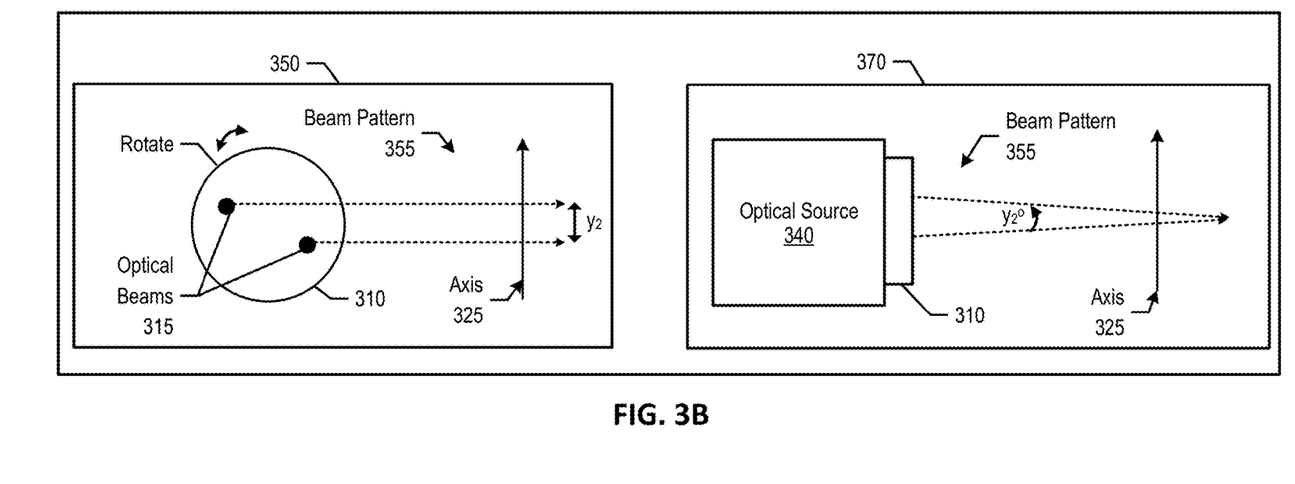

FIGS. 3A-3B are block diagrams depicting examples of rotating an optical source with two optical beams to change a vertical beam-to-beam spacing angle in one or more scan frames, according to some embodiments. FIG. 3A depicts an example of a beam pattern 305 with two optical beams being adjusted by rotating an optical source. Diagram 300 depicts a view looking into lens 310 of optical source 340, which shows the two optical beams 315 forming beam pattern 305 where the two optical beams 315 are separated by y1 along axis 325. Axis 325, in one embodiment, is an axis in a vertical direction relative to the positioning of LIDAR system 100.

Diagram 330 depicts a side view of optical source 340 that transmits out beam pattern 305 through lens 310. As discussed herein, the angle between optical beams 315 remains fixed as optical source 340 rotates. However, by rotating optical source 340, the vertical angle changes, which is denoted as yn°. Diagram 330 shows that beam pattern 305 produces a vertical angle of y1° along axis 325.

Referring to FIG. 3B, optical source 340 may be rotated to form an adjusted beam pattern 355 such that optical beams 315 are separated by y2 along axis 325. Diagram 370 depicts a side view of optical source 340 that transmits out beam pattern 355 through lens 310. As can be seen, the vertical angle along axis 325 changes from y1° in diagram 330 to y2° in diagram 370 to produce a narrower angle where y2° is less than y1°.

As discussed herein, a beam pattern rotation may be introduced to the beam pattern at optical source 340 and/or at other components within LIDAR system 100, such as at one or more scanners (e.g., 1D scanners, see, e.g., FIGS. 5A-5D and corresponding text for further details). In one embodiment, optical source 340 may provide additional optical beams that, in turn, create a beam pattern that forms an adjusted beam pattern utilizing the approach discussed herein (see, e.g., FIG. 4A-4B and corresponding text for further details).

In some embodiments, optical source 340 may generate optical beams of any wavelength (e.g., 905 nanometer (nm), 1550 nm) to cause the beam pattern to include optical beams of the same wavelength or different wavelengths. For example, optical source 340 may generate optical beams that include a subset of optical beams that have a wavelength of 905 nm to detect objects of a particular type (e.g., water, rain and fog, and snow), and a different subset of optical beams that have a wavelength of 1550 nm to detect objects of a different type (e.g., vehicles, street signs, pedestrian).

Figure 4A:
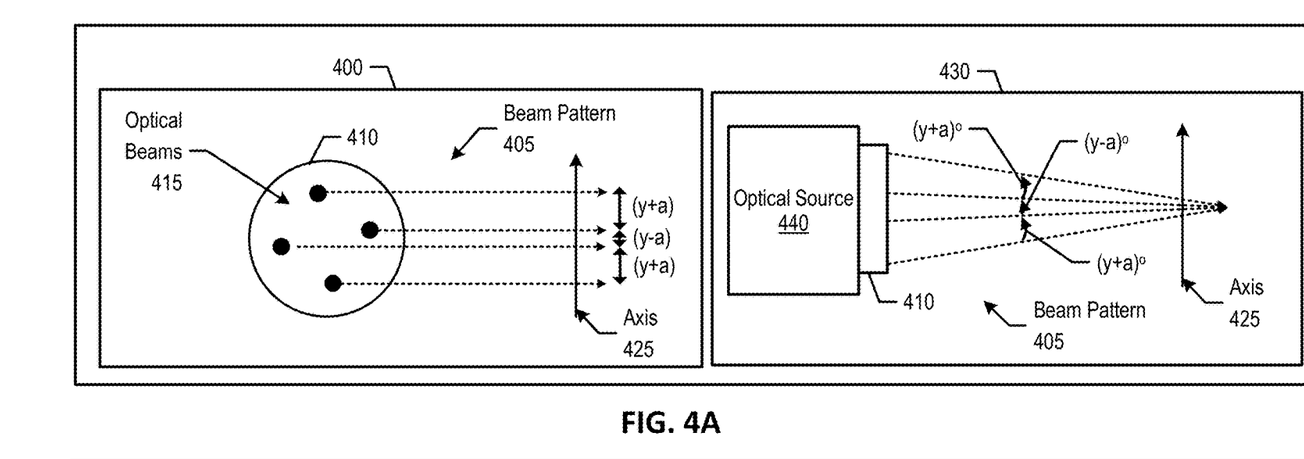
FIGS. 4A-4B are block diagrams depicting examples of adjusting a beam pattern originating from an optical source that transmits four optical beams.
Figure 4B:
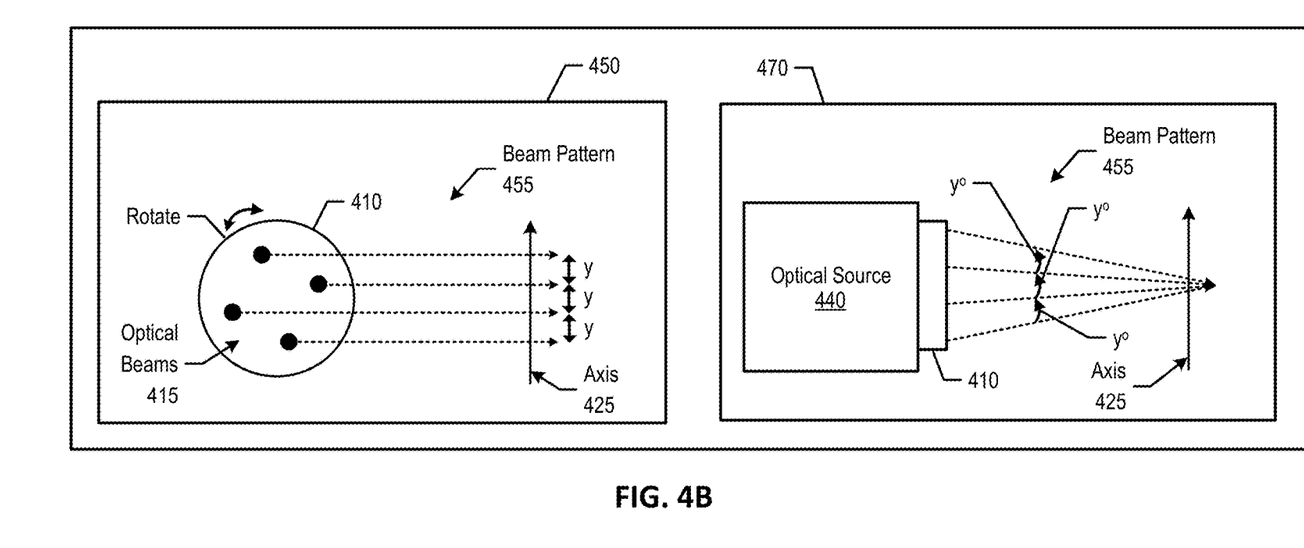

FIGS. 4A-4B are block diagrams depicting examples of rotating an optical source with four optical beams to change vertical beam-to-beam spacing angles, according to some embodiments. FIG. 4A depicts an example of a beam pattern 405 with four optical beams being adjusted by rotating an optical source. Diagram 400 depicts a view looking into lens 410 of optical source 440, which shows four optical beams 415 forming beam pattern 405 where the four optical beams 415 are separated by (y+a), (y−a), and (y+a) along axis 425. Axis 425, in one embodiment, is an axis in a vertical direction relative to the positioning of LIDAR system 100.

Diagram 430 depicts a side view of optical source 440 that transmits out beam pattern 405 through lens 410. Diagram 430 shows that beam pattern 405 produces vertical angles along axis 425 of (y+a°), (y−a°), and (y+a°).

Referring to FIG. 4B, using techniques similar to the approaches described above in FIGS. 3A-3B above, optical source 440 may be rotated to form an adjusted beam pattern 455 such that optical beams 415 are separated by an equivalent vertical angle y° along axis 425. Diagram 470 depicts a side view of optical source 440 that transmits out beam pattern 455 through lens 410. As can be seen, the vertical angles along axis 425 between the beams is equivalent at y°.

As discussed herein, a beam pattern rotation may be introduced to the beam pattern at optical source 440 and/or at other components within LIDAR system 100, such as at one or more scanners (e.g., 1D scanners, see, e.g., FIGS. 5A-5D and corresponding text for further details). In some embodiments, optical source 440 may generate optical beams of any wavelength (e.g., 905 nanometer (nm), 1550 nm) to cause the beam pattern to include optical beams of the same wavelength or different wavelengths. For example, optical source 440 may generate optical beams that include a subset of optical beams that have a wavelength of 905 nm to detect objects of a particular type (e.g., water, rain and fog, and snow), and a different subset of optical beams that have a wavelength of 1550 nm to detect objects of a different type (e.g., vehicles, street signs, pedestrian).

Figure 5A:
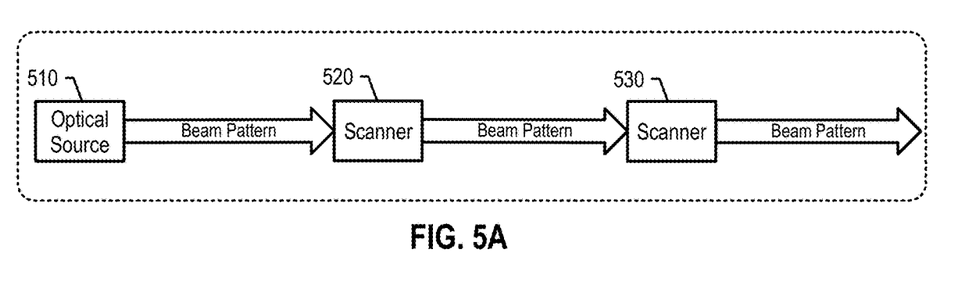
FIGS. 5A-5D depict various embodiments of transforming a beam pattern to an adjusted beam pattern.

FIGS. 5A-5D depict various transformations of beam patterns performed by embodiments of the present disclosure. FIG. 5A shows an initial configuration that does not transform the beam pattern to the adjusted beam pattern. Optical source 510 transmits the beam pattern to scanner 520. Scanner 520 may be, for example, a 1D scanner that scans in the vertical direction relative to optical source 510. In the initial configuration, scanner 520 may transmit the beam pattern unaltered to scanner 530. Scanner 530 may be, for example, an azimuth scanner relative to scanner 520 that transmits the beam pattern unaltered to the external environment.

Figure 5B:
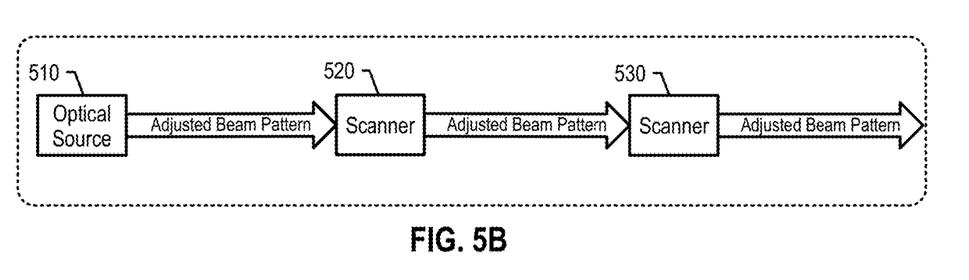

FIG. 5B is a diagram depicting the beam pattern being transformed to the adjusted beam pattern at optical source 510, similar to that shown in FIGS. 3A, 3B, 4A, and 4B. Optical source 510 transmits the adjusted beam pattern to scanner 520. Scanner 520 transmits the adjusted beam pattern unaltered to scanner 530, which in turn transmits the adjusted beam pattern to the external environment.

Figure 5C:
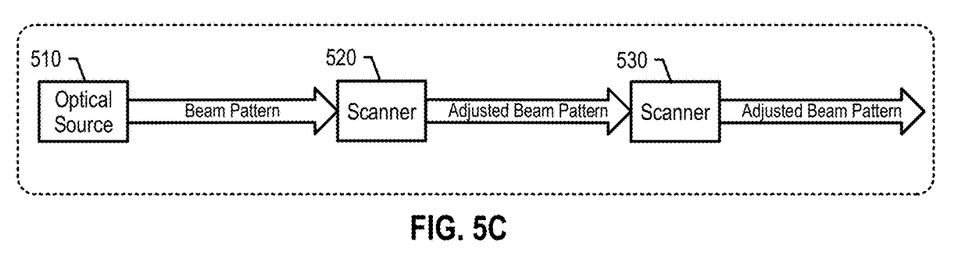

FIG. 5C is a diagram depicting scanner 520 transforming the beam pattern to the adjusted beam pattern. Optical source 510 transmits the beam pattern to scanner 520. Scanner 520 is configured to introduce a rotational element into the beam pattern. The rotation element, in one embodiment, is achieved by rotating scanner 520 about a different axis that is not parallel (e.g., perpendicular) to optical source 510's beam pattern output. As such, scanner 520 transforms the beam pattern into the adjusted beam pattern, which scanner 520 transmits to scanner 530. Scanner 530 then transmits the adjusted beam pattern to the external environment.

Figure 5D:
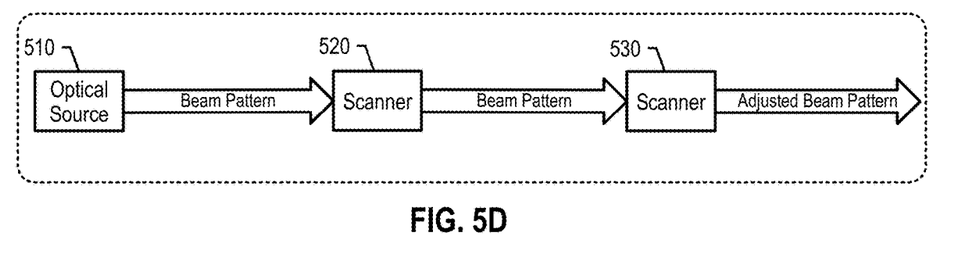

FIG. 5D is a diagram depicting scanner 530 transforming the beam pattern to the adjusted beam pattern. Optical source 510 transmits the beam pattern to scanner 520. Scanner 520 is not configured to introduce a rotation element into the beam pattern and, in turn, transmits the beam pattern to scanner 530. Scanner 530 is configured to introduce a rotation element into the beam pattern by rotating scanner 530 about a different axis that is not parallel to optical source 510's beam pattern output. In turn, scanner 530 transforms the beam pattern into the adjusted beam pattern and transmits the adjusted beam pattern to the external environment.

In one embodiment, scanner 520 may be configured to introduce a portion of the rotation element into the beam pattern and scanner 530 is configured to introduce the remaining portion of the rotation element to eventually produce the adjusted beam pattern from scanner 530.

Figure 6:
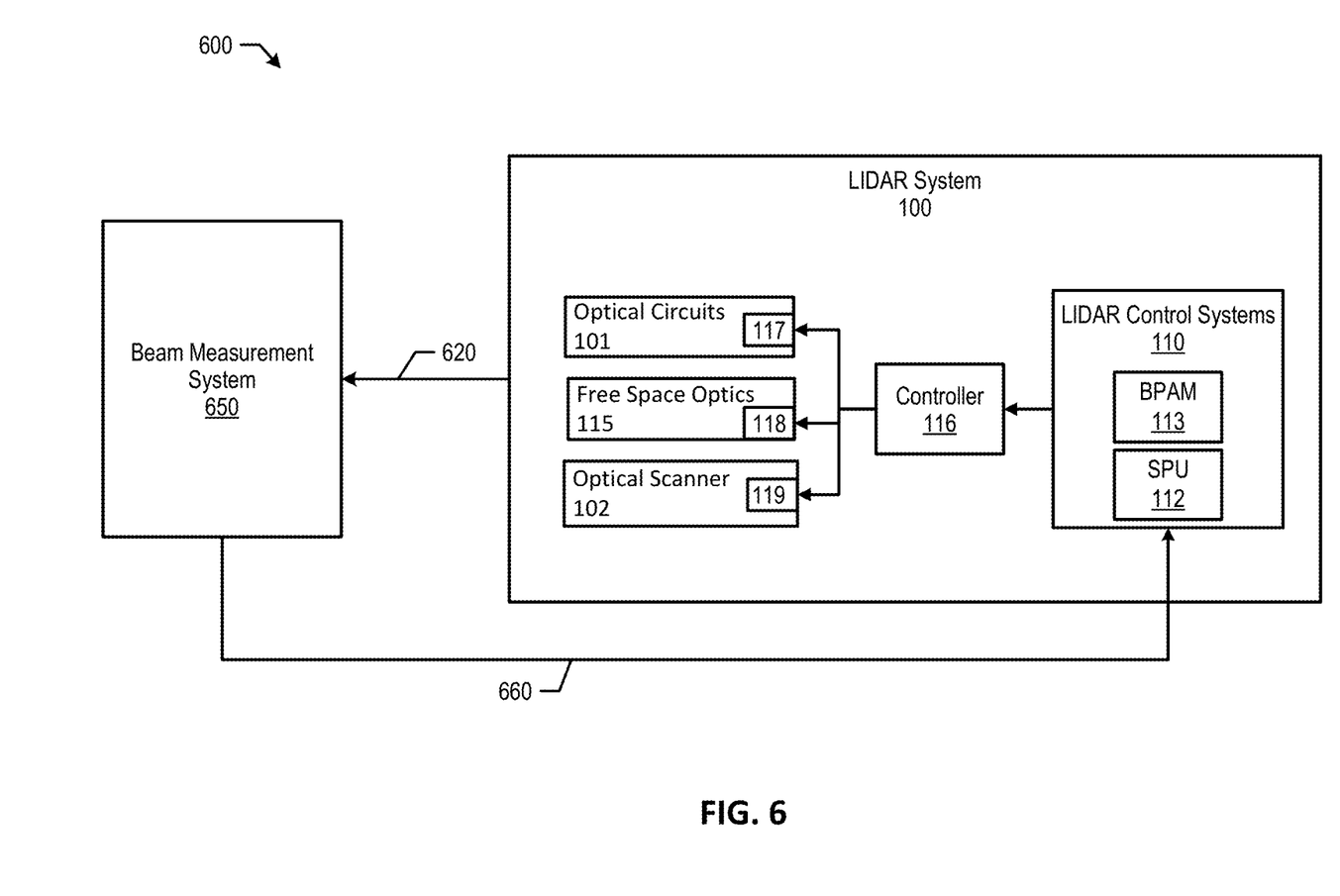
FIG. 6 is a block diagram depicting an example of using a beam measurement system to calibrate a LIDAR system.

FIG. 6 is a block diagram depicting an example of using a beam measurement system to set a particular beam pattern in a LIDAR system, according to some embodiments. In some embodiments, beam measurement system 650 couples to LIDAR system 100, such as during factory test, to set a particular beam pattern and read an output beam pattern from LIDAR system 100. Beam measurement system 650 may include hardware, software, or a combination of hardware and software.

Beam measurement system 650, in some embodiments, includes a camera that reads beam spacings from beam pattern 620 and provides feedback 660 to information to signal processing unit 112. Signal processing unit 112, when executing beam pattern adjustment module 113, then directs controller 116 to instruct adjustment components 117, 118, and/or 119 to move optical circuits 101, free space optics 115, and/or optical scanner 102 accordingly to form a desired beam pattern. In some embodiments, adjustment components 117, 118, and/or 119 include motorized stages, such as actuators, that adjust (e.g., rotate) scanners and/or optical sources. In some embodiments, adjustment components 117, 118, and 119 include components for adjusting at discrete increments, such as gears, magnets, and etc..

In some embodiments, signal processing unit 112, when executing beam pattern adjustment module 113, communicates directly with adjustment components 117, 118, and 119 to move optical circuits 101, free space optics 115, and/or optical scanner 102. In some embodiments, beam measurement system 650 determines the vertical angle between the optical beams along an axis and provides the vertical angle to signal processing unit 112. Then, signal processing unit 112 determines the amount at which to adjust optical circuits 101, free space optics 115, and/or optical scanner 102 via adjustment components 117, 118, and/or 119.

Figure 7:
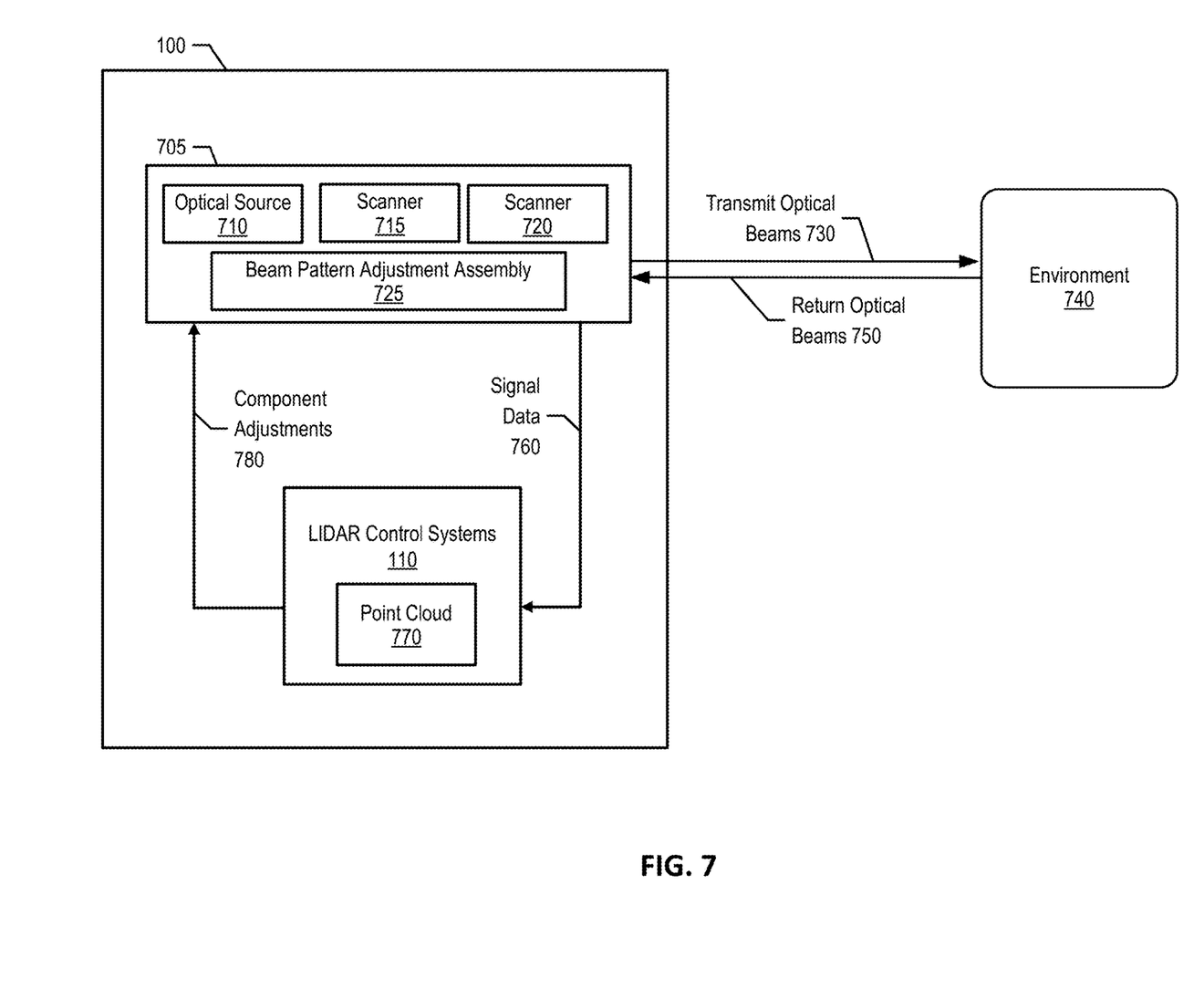
FIG. 7 is a block diagram depicting an example of dynamically adjusting the beam patterns in real-time based on point cloud analysis.

FIG. 7 is a block diagram depicting an example of a LIDAR system that dynamically adjusts beam patterns in real-time based on point cloud analysis. In field conditions, vehicle shock, vibration, and temperature fluctuations may cause the beam angular spacings to change. FIG. 7 shows an embodiment of LIDAR control systems 110 analyzing a point cloud 770 and adjusting one or more components in optical assembly 705 accordingly to form a different beam pattern, such as a different beam pattern that results in non-uniform beam angular spacing in point cloud 770.

Optical assembly 705, in one embodiment, includes optical source 710, scanner 715, scanner 720, and beam pattern adjustment assembly 725. Optical source 710 is similar to optical source 340, 440, and 510 discussed herein, and produces multiple optical beams that feed into scanner 715. Scanner 715 is similar to scanner 520 from FIGS. 5A-5D, and scanner 720 is similar to scanner 530 from FIGS. 5A-5D. Beam pattern adjustment assembly 725 include components that adjust optical source 710, scanner 715, and/or scanner 720 to form a particular beam pattern as discussed herein, such as actuators, gears, magnets, and etcetera.

Optical assembly 705 sends transmit optical beams 730 towards environment 740. Transmit optical beams 730, in one embodiment, form a beam pattern, such as the adjusted beam pattern discussed herein. Transmit optical beams 730 reflect off of environment 740 to produce return optical beams 750, which are captured by optical assembly 705 (e.g., optical scanner 102 in FIG. 1). Signal data 760 is generated from return optical beams and passes to LIDAR control systems 110, which creates point cloud 770 from signal data 760 (see FIGS. 1, 2, and corresponding text for further details).

LIDAR control systems 110 (e.g., beam pattern adjustment module 113) analyzes point cloud 770 to determine whether adjustments are required to the beam pattern. In one embodiment, LIDAR control systems 110 determines that point cloud 770 includes unwanted gaps, such as due to the beam pattern changing from vibration and/or environmental conditions. In this embodiment, LIDAR control systems 110 determines what components from beam pattern adjustment assembly 725 to adjust and sends component adjustments 780 to optical assembly 705 accordingly. For example, LIDAR control systems 110 may determine that optical source 710 requires a 1.2° counterclockwise rotation and sends instructions to an actuator coupled to optical source 710 to rotate optical source 710.

In one embodiment, LIDAR control systems 110 determines that point cloud 770 includes an object and wishes to have increased resolution information about the object. In this embodiment, LIDAR control systems 110 determines what components in beam pattern adjustment assembly 725 to adjust to "tighten" certain beam angular spacings and sends component adjustments 780 to optical assembly 705 accordingly. For example, LIDAR control systems 110 may determine that a combination of rotating scanner 715 and rotating scanner 720 will produce a beam pattern with tightened beam angular spacings. In this example, LIDAR control systems 110 may send instructions to actuators coupled to scanner 715 and scanner 720, respectively, to rotate their corresponding scanners.

Figure 8:
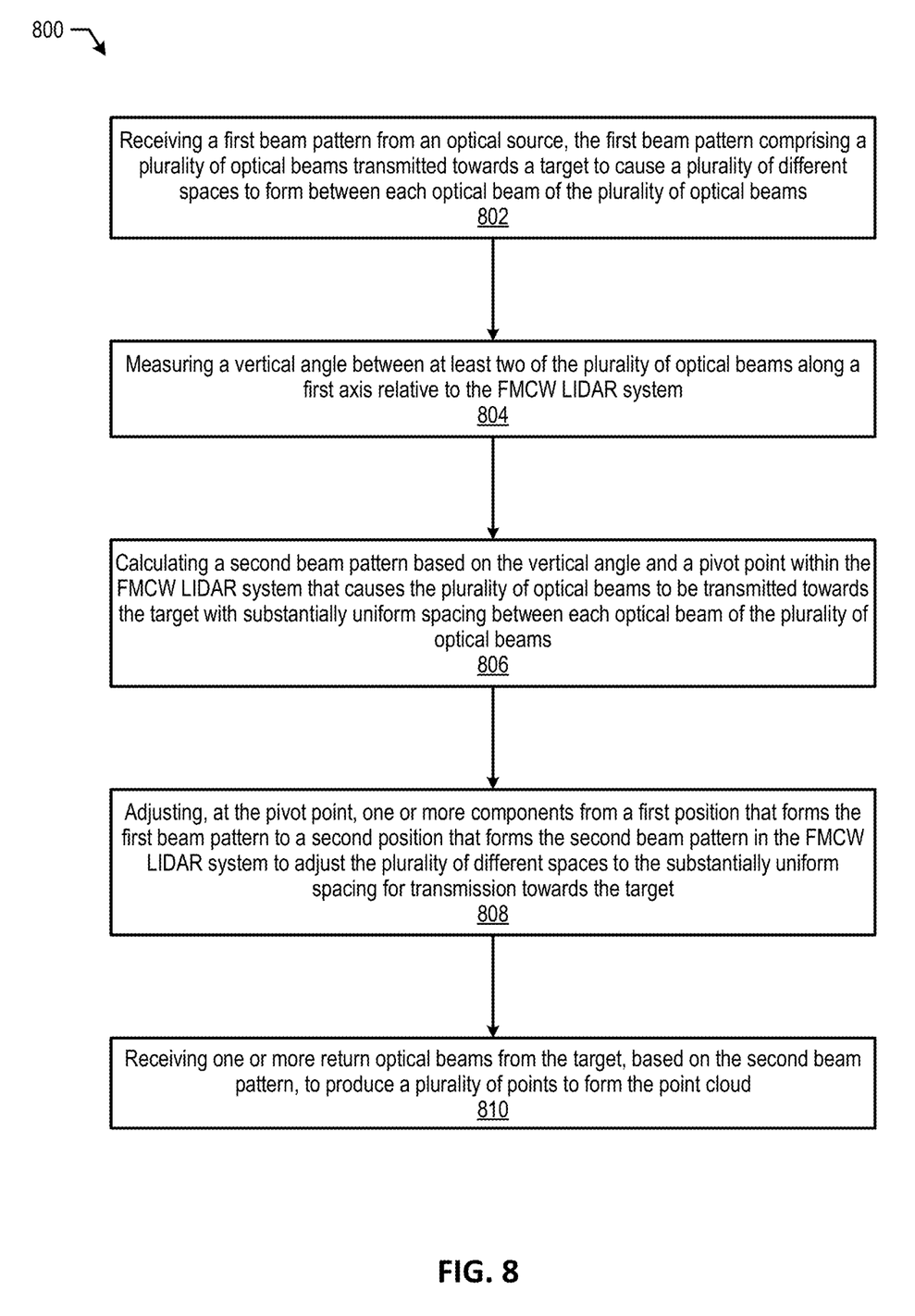
FIG. 8 is a flow diagram of an example method for adjusting a beam pattern in an FMCW LIDAR system.

FIG. 8 is a flow diagram depicting an example method for transforming a beam pattern into an adjusted beam pattern, according to some embodiments. Additional, fewer, or different operations may be performed in the method depending on the particular arrangement. In some embodiments, some or all operations of method 800 may be performed by one or more processors executing on one or more computing devices, systems, or servers (e.g., remote/networked servers or local servers). In some embodiments, method 800 may be performed by a signal processing unit, such as signal processing unit 112 in FIG. 1. Each operation may be re-ordered, added, removed, or repeated. In some embodiments, method 800 may be performed by processing logic including hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

In some embodiments, the method 800 may include operation 802, where the processing logic receives a beam pattern from an optical source. In some embodiments, the beam pattern includes optical beams transmitted towards a target to cause different spaces to form between each optical beam of the optical beams.

In some embodiments, the method 800 may include operation 804, where the processing logic measures a vertical angle between the optical beams along an axis relative to the FMCW LIDAR system. In some embodiments, the method 800 may include operation 806, where the processing logic calculates an adjusted beam pattern based on the vertical angle and a pivot point within the FMCW LIDAR system that causes the optical beams to be transmitted towards the target with substantially uniform spacing between each optical beam of the optical beams.

In some embodiments, the method 800 may include operation 808, where the processing logic adjusts, at the pivot point, one or more components from a position that forms the beam pattern to an adjusted position that forms the adjusted beam pattern in the FMCW LIDAR system to adjust the different spaces to the substantially uniform spacing for transmission towards the target. In some embodiments, the method 800 may include operation 808, where the processing logic receives one or more return optical beams from the target, based on the adjusted beam pattern, to produce points to form the point cloud.

The preceding description sets forth numerous specific details such as examples of specific systems, components, methods, and so forth, in order to provide a good understanding of several embodiments of the present disclosure. It will be apparent to one skilled in the art, however, that some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method of adjusting a beam pattern to form a point cloud in a frequency-modulated continuous wave (FMCW) light detection and ranging (LIDAR) system, the method comprising:
    receiving, from an optical source, a first beam pattern that comprises a plurality of optical beams transmitted towards a target;
    measuring a first vertical angle between at least two of the plurality of optical beams along a first axis relative to the FMCW LIDAR system;
    calculating, using a processor, a second beam pattern based on the first vertical angle and a pivot point within the FMCW LIDAR system, wherein the second beam pattern produces a second vertical angle between the at least two of the plurality of optical beams;
    adjusting, at the pivot point, one or more components from a first position that forms the first beam pattern to a second position that forms the second beam pattern for transmission towards the target; and
    receiving one or more return optical beams from the target, based on the second beam pattern, to produce a plurality of points to form the point cloud.

2. The method of claim 1, wherein the plurality of optical beams comprise a first optical beam, a second optical beam, and a third optical beam, the method further comprising:
    detecting an object in response to analyzing the point cloud;
    responsive to detecting the object, calculating a third beam pattern that produces a third vertical angle between the first optical beam and the second optical beam, and produces a fourth vertical angle between the second optical beam and the third optical beam; and
    adjusting, at the pivot point, the one or more components from the second position to a third position that forms the third beam pattern.

3. The method of claim 2, wherein the third vertical angle is less than the fourth vertical angle that concentrates the first optical beam and the second optical beam towards the target.

4. The method of claim 1, wherein the adjusting the one or more components adjusts each one of the plurality of optical beams.

5. The method of claim 1, wherein at least a portion of the adjusting of the one or more components rotates the optical source about a second axis relative to the first axis.

6. The method of claim 1, further comprising:
receiving the first beam pattern generated by the optical source at a scanner,
wherein the adjusting further comprises rotating the scanner about a second axis not parallel to the first axis.

7. The method of claim 6, wherein the scanner is a first scanner, the method further comprising:
receiving the first beam pattern from the first scanner at a second scanner,
wherein the adjusting further comprises rotating the second scanner until the second beam pattern is formed.

8. A frequency-modulated continuous wave (FMCW) light detection and ranging (LIDAR) system comprising:
an optical source to generate a first beam pattern comprising a plurality of optical beams transmitted towards a target;
a memory to store a set of instructions; and
a processor coupled to the memory that, when executing the set of instructions, is configured to:
measure a first vertical angle between at least two of the plurality of optical beams along a first axis relative to the FMCW LIDAR system;
calculate a second beam pattern based on the first vertical angle and a pivot point within the FMCW LIDAR system, wherein the second beam pattern produces a second vertical angle between the at least two of the plurality of optical beams;
adjust, at the pivot point, one or more components from a first position that forms the first beam pattern to a second position that forms the second beam pattern for transmission towards the target; and
receive one or more return optical beams from the target, based on the second beam pattern, to produce a plurality of points to form a point cloud.

9. The FMCW LIDAR system of claim 8, wherein the plurality of optical beams comprise a first optical beam, a second optical beam, and a third optical beam, and wherein the processor is configured to:
detect an object in response to analyzing the point cloud;
calculate a third beam pattern that produces a third vertical angle between the first optical beam and the second optical beam, and produces a fourth vertical angle between the second optical beam and the third optical beam; and
adjust, at the pivot point, the one or more components from the second position to a third position that forms the third beam pattern.

10. The FMCW LIDAR system of claim 9, wherein the third vertical angle is less than the fourth vertical angle that concentrates the first optical beam and the second optical beam towards the target.

11. The FMCW LIDAR system of claim 8, wherein each one of the plurality of optical beams adjusts to form the second beam pattern.

12. The FMCW LIDAR system of claim 8, wherein at least a portion of the adjusting of the one or more components rotates the optical source about a second axis relative to the first axis.

13. The FMCW LIDAR system of claim 8, further comprising:
a scanner that receives the first beam pattern; and
wherein, to adjust the one or more components, the processor is further configured to rotate the scanner about a second axis not parallel to the first axis.

14. The FMCW LIDAR system of claim 13, wherein the scanner is a first scanner, the system further comprising:
a second scanner; and
wherein the processor is further configured to rotate both the first scanner and the second scanner until the second beam pattern is formed.

15. A frequency-modulated continuous wave (FMCW) light detection and ranging (LIDAR) system, the system comprising:
an optical assembly comprising:
an optical source and one or more scanners, wherein the optical assembly generates a first beam pattern comprising a plurality of optical beams transmitted towards a target; and
a beam pattern adjustment assembly, wherein the beam pattern adjustment assembly further to adjust, at a pivot point, one or more components from a first position that forms the first beam pattern to a second position that forms a second beam pattern; and
a LIDAR control system coupled to the optical assembly, comprising one or more processors, wherein the LIDAR control system to:
measure a first vertical angle between at least two of the plurality of optical beams along a first axis relative to the FMCW LIDAR system;
calculate the second beam pattern based on the first vertical angle and the pivot point within the FMCW LIDAR system, wherein the second beam pattern produces a second vertical angle between the at least two of the plurality of optical beams;
instruct the beam pattern adjustment assembly to adjust the one or more components; and
receive one or more return optical beams from the target, based on the second beam pattern, to produce a plurality of points to form a point cloud.

16. The FMCW LIDAR system of claim 15, wherein the plurality of optical beams comprise a first optical beam, a second optical beam, and a third optical beam, and wherein the LIDAR control system further to:
detect an object in response to analysis of the point cloud;
calculate a third beam pattern that produces a third vertical angle between the first optical beam and the second optical beam, and produces a fourth vertical angle between the second optical beam and the third optical beam; and
adjust, at the pivot point, the one or more components from the second position to a third position that forms the third beam pattern.

17. The FMCW LIDAR system of claim 16, wherein the third vertical angle is less than the fourth vertical angle that concentrates the first optical beam and the second optical beam towards the target.

18. The FMCW LIDAR system of claim 15, wherein each one of the plurality of optical beams adjusts to form the second beam pattern.

19. The FMCW LIDAR system of claim 15, wherein at least a portion of the adjusting of the one or more components rotates the optical source about a second axis relative to the first axis.

20. The FMCW LIDAR system of claim 15, wherein at least a portion of the adjusting rotates at least one scanner from the one or more scanners about a second axis not parallel to the first axis.

* * * * *